United States Patent
Ida et al.

(10) Patent No.: US 10,930,249 B2
(45) Date of Patent: Feb. 23, 2021

(54) INFORMATION PROCESSOR, INFORMATION PROCESSING METHOD, AND RECORDING MEDIUM

(71) Applicant: SONY CORPORATION, Tokyo (JP)

(72) Inventors: Kentaro Ida, Tokyo (JP); Takuya Ikeda, Tokyo (JP); Fumihiko Iida, Kanagawa (JP); Ryuichi Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/487,681

(22) PCT Filed: Jan. 25, 2018

(86) PCT No.: PCT/JP2018/002182
§ 371 (c)(1),
(2) Date: Aug. 21, 2019

(87) PCT Pub. No.: WO2018/163637
PCT Pub. Date: Sep. 13, 2018

(65) Prior Publication Data
US 2020/0074960 A1    Mar. 5, 2020

(30) Foreign Application Priority Data
Mar. 9, 2017 (JP) .............................. JP2017-044902

(51) Int. Cl.
*G09G 5/36* (2006.01)
*G06F 3/16* (2006.01)

(52) U.S. Cl.
CPC ................. *G09G 5/36* (2013.01); *G06F 3/16* (2013.01)

(58) Field of Classification Search
CPC .......... G06F 3/01; G06F 3/0346; G06F 3/048; G06F 3/16; G09G 5/36
See application file for complete search history.

(56) References Cited

U.S. PATENT DOCUMENTS

2019/0011983 A1*  1/2019  Yasuda ................. G06F 3/0346

FOREIGN PATENT DOCUMENTS

| JP | 2005-313291 A | 11/2005 |
| JP | 2012-226695 A | 11/2012 |
| JP | 2015-090524 A | 5/2015 |
| JP | 2017-016588 A | 1/2017 |

OTHER PUBLICATIONS

Tanaka, Machine Translation of JP-201716588, Jun. 20, 2020, Jan. 2017.*
Yamamoto, Machine Translation of JP-2005313291 on Jun. 20, 2020, Nov. 2005.*
Oshima, Machine Translation of JP-2012226695, on Jun. 20, 2020, Nov. 2012.*

* cited by examiner

*Primary Examiner* — Sisay Yacob
(74) *Attorney, Agent, or Firm* — Paratus Law Group, PLLC

(57) ABSTRACT

There is provided a mechanism to help a user to notice by guiding the user. An information processor including a guidance controller that causes a projection device to project, in a space in which a user is located, guidance information for guiding the user to a guidance location, on the basis of environment information regarding the space and user information indicating a position and a line of sight of the user.

20 Claims, 14 Drawing Sheets

INFORMATION PROCESSOR, INFORMATION PROCESSING METHOD, AND RECORDING MEDIUM

CROSS REFERENCE TO PRIOR APPLICATION

This application is a National Stage Patent Application of PCT International Patent Application No. PCT/JP2018/002182 (filed on Jan. 25, 2018) under 35 U.S.C. § 371, which claims priority to Japanese Patent Application No. 2017-044902 (filed on Mar. 9, 2017), which are all hereby incorporated by reference in their entirety.

TECHNICAL FIELD

The present disclosure relates to an information processor, an information processing method, and a recording medium.

BACKGROUND ART

In recent years, various display devices, including fixed display devices such as a television receiver (hereinafter also simply referred to as TV) and a projector, and mobile display devices such as a smartphone and a notebook personal computer (PC), have been developed. For example, Patent Document 1 below discloses a tabletop interactive projector that projects an image on a table and enables interaction between an image shown on the table and a user.

CITATION LIST

Patent Document

Patent Document 1: Japanese Patent Application Laid-Open No. 2015-90524

SUMMARY OF THE INVENTION

Problems to be Solved by the Invention

In the technology described in aforementioned Patent Document 1 and the like, it is assumed that the user views the screen as a matter of course. However, the user does not necessarily look at the screen constantly. Accordingly, in some cases, the user does not notice information that should be noticed, such as a notification to the user, displayed on the screen. This is not limited to the display device. For example, the user does not notice a time displayed on a clock, an object to be searched, or the like, if they are not within the user's view. In addition, the user does not notice audio notification such as a ring tone, either, once it is cancelled out by environmental sound.

Hence, the present disclosure proposes a mechanism for helping a user to notice by guiding the user.

Solutions to Problems

According to the present disclosure, provided is an information processor including a guidance controller that causes a projection device to project, in a space in which a user is located, guidance information for guiding the user to a guidance location, on the basis of environment information regarding the space and user information indicating a position and a line of sight of the user.

Further, according to the present disclosure, provided is an information processing method including a step of causing a projection device to project, in a space in which a user is located, guidance information for guiding the user to a guidance location, on the basis of environment information regarding the space and user information indicating a position and a line of sight of the user.

Further, according to the present disclosure, provided is a recording medium that records a program for causing a computer to function as a guidance controller that causes a projection device to project, in a space in which a user is located, guidance information for guiding the user to a guidance location, on the basis of environment information regarding the space and user information indicating a position and a line of sight of the user.

According to the present disclosure, guidance information for guiding a user to a guidance location is projected by a projection device in a space in which the user is located. This makes it possible to help the user to notice by guiding the user to information that the user should notice.

Effects of the Invention

As described above, according to the present disclosure, there is provided a mechanism for helping a user to notice by guiding the user. Note that the effect is not necessarily limited to that described above, and any of the effects illustrated in the present specification or other effects that can be grasped from the present specification may be exerted in addition to or instead of the effect described in the preceding paragraph.

MODE FOR CARRYING OUT THE INVENTION

Figure 1:
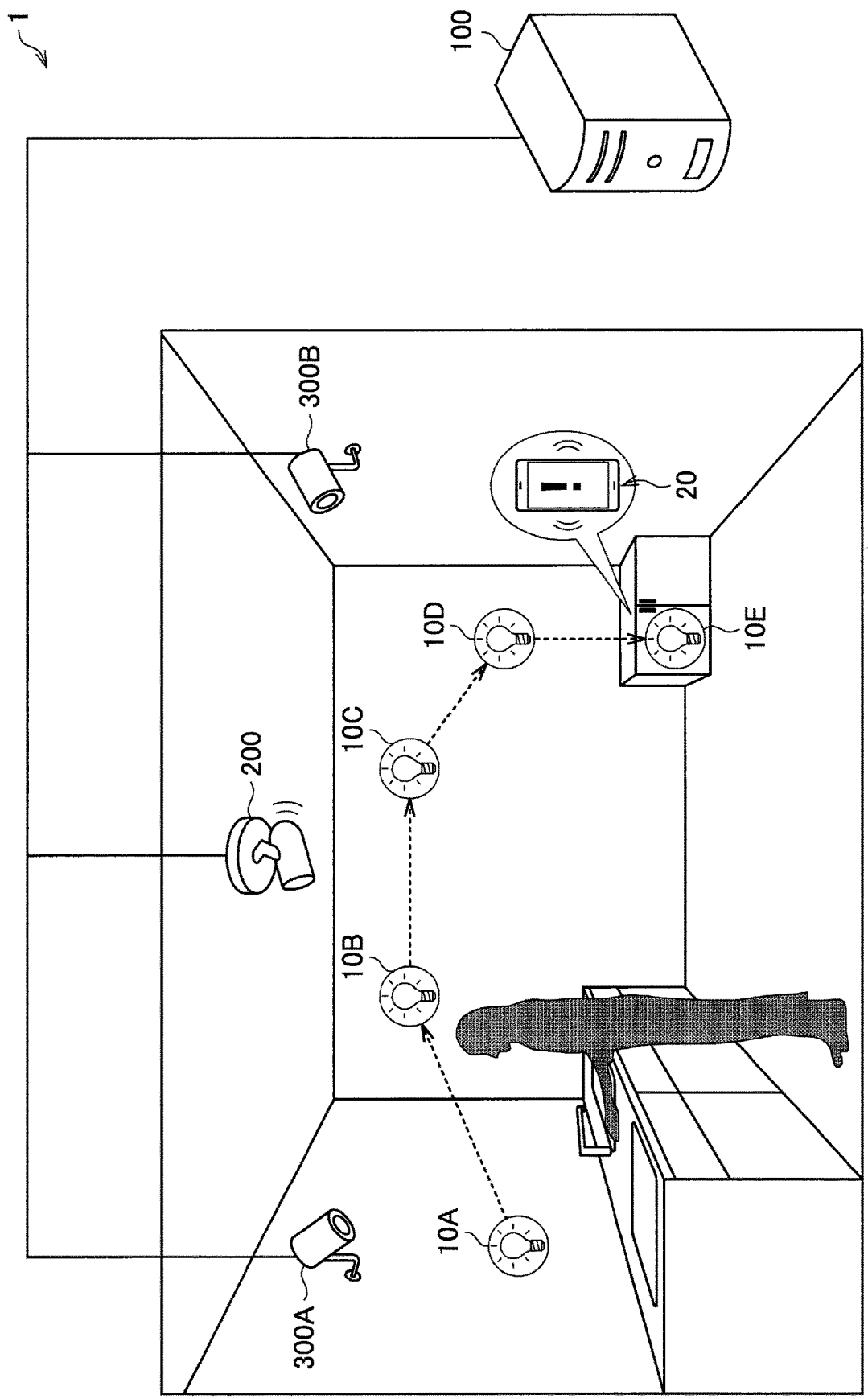
FIG. 1 is a diagram for describing an outline of a system according to an embodiment of the present disclosure.

Hereinafter, preferred embodiments of the present disclosure will be described in detail with reference to the accompanying drawings. Note that in the present specification and the drawings, components having substantially the same functional configuration will be assigned the same reference numerals, and redundant description will be omitted.

Note that the description will be given in the following order.

1. Preface
1.1. Outline of system
1.2. Technical issue
2. Configuration example
3. Processing flow
4. Example
4.1. First example
4.2. Second example
5. Hardware configuration example
6. Conclusion

1. PREFACE

<1.1. Outline of System>

FIG. 1 is a diagram for describing an outline of a system 1 according to an embodiment of the present disclosure. As shown in FIG. 1, the system 1 according to the embodiment includes an information processor 100, an output device 200, and sensor devices 300 (300A and 300B).

The sensor device 300 is a device that senses various information. For example, the sensor device 300 includes a camera, a microphone, and the like, and senses information regarding a user and a space in which the user is located. For example, the sensor device 300 senses the user's position, posture, line of sight, the shape of a room, arrangement of furniture, and an incoming call on a smartphone 20 stored in a cabinet.

The output device 200 is a device that outputs various information from the information processor 100. For example, the output device 200 is a so-called moving projector, and is capable of projecting information on any location (i.e., region), such as a wall, a floor, or furniture, included in a space sensed by the sensor device 300, using the location as a projection location (i.e., projection surface or projection region). Note, however, that the projection location is not limited to a flat surface, and may be a curved surface or may be divided into multiple surfaces.

The information processor 100 controls the output device 200 and the sensor device 300 to perform user guidance processing. Specifically, the information processor 100 guides the user to a location (hereinafter, also referred to as guidance location) corresponding to information that the user should notice, which is out of the view of the user.

For example, it is assumed that an incoming call arrives on the smartphone 20 stored in the cabinet while the user is doing household chores in a room. In this case, the system 1 performs guidance processing for guiding the user to the smartphone 20, by projecting guidance information by the output device 200, on the basis of information sensed by the sensor device 300. Specifically, first, the system 1 allows the user to notice initially by projecting guidance information 10A on a wall in the direction of the user's line of sight, using the wall as the projection location. When the user notices the guidance information 10A, the system 1 projects guidance information 10B to guide the user's line of sight to the guidance information 10B. Then, after the user's line of sight is guided by the guidance information 10B; the system 1 projects guidance information 10C, then after the user's line of sight is guided by the guidance information 10C, the system 1 projects guidance information 10D; and after the user's line of sight is guided by the guidance information 10D, the system 1 projects guidance information 10E. The guidance information 10E is projected on a front surface of the cabinet in which the smartphone 20 is stored, using the front surface as the projection location. As a result, the system 1 can guide the user to the smartphone 20 to notice the incoming call.

Note that one each or multiple output devices 200 and sensor devices 300 may be provided.

<1.2. Technical Issue>

In recent years, various display devices including fixed display devices, such as a television receiver and a projector, and mobile display devices, such as a smartphone and a notebook PC, have been developed. However, the user does not necessarily look at the screen constantly. Hence, in some cases, the user does not notice information that should be noticed such as a notification to the user displayed on the screen. For example, various display devices in the space in which the user is located are switched from a certain display to another display or turned ON from an OFF state of the screen, due to external factors other than user operation such as mail reception, schedule notification, notification by a message application, or the like. Such display resulting from an external factor is difficult for the user to notice. Additionally, in the case of the so-called moving projector capable of projecting on any location in a space, the user may not notice an image precisely because the image is projected on any location.

As a countermeasure, a smart phone has been configured to sound a ring tone or vibrate, for example. However, in some cases, the ringing tone is not noticed because, for example, it is cancelled out by environmental sound, the user is listening to another sound (e.g., on the phone or listening to music), or the user is in another room. Additionally, in some cases, vibration is unnoticed unless the user is carrying the smartphone. Furthermore, in the case of a mobile device, since the device is not always placed in the same place, there have been situations where the device cannot be found when necessary.

Hence, the embodiment proposes a mechanism for helping a user to notice by guiding the user to information that the user should notice.

2. CONFIGURATION EXAMPLE

Figure 2:
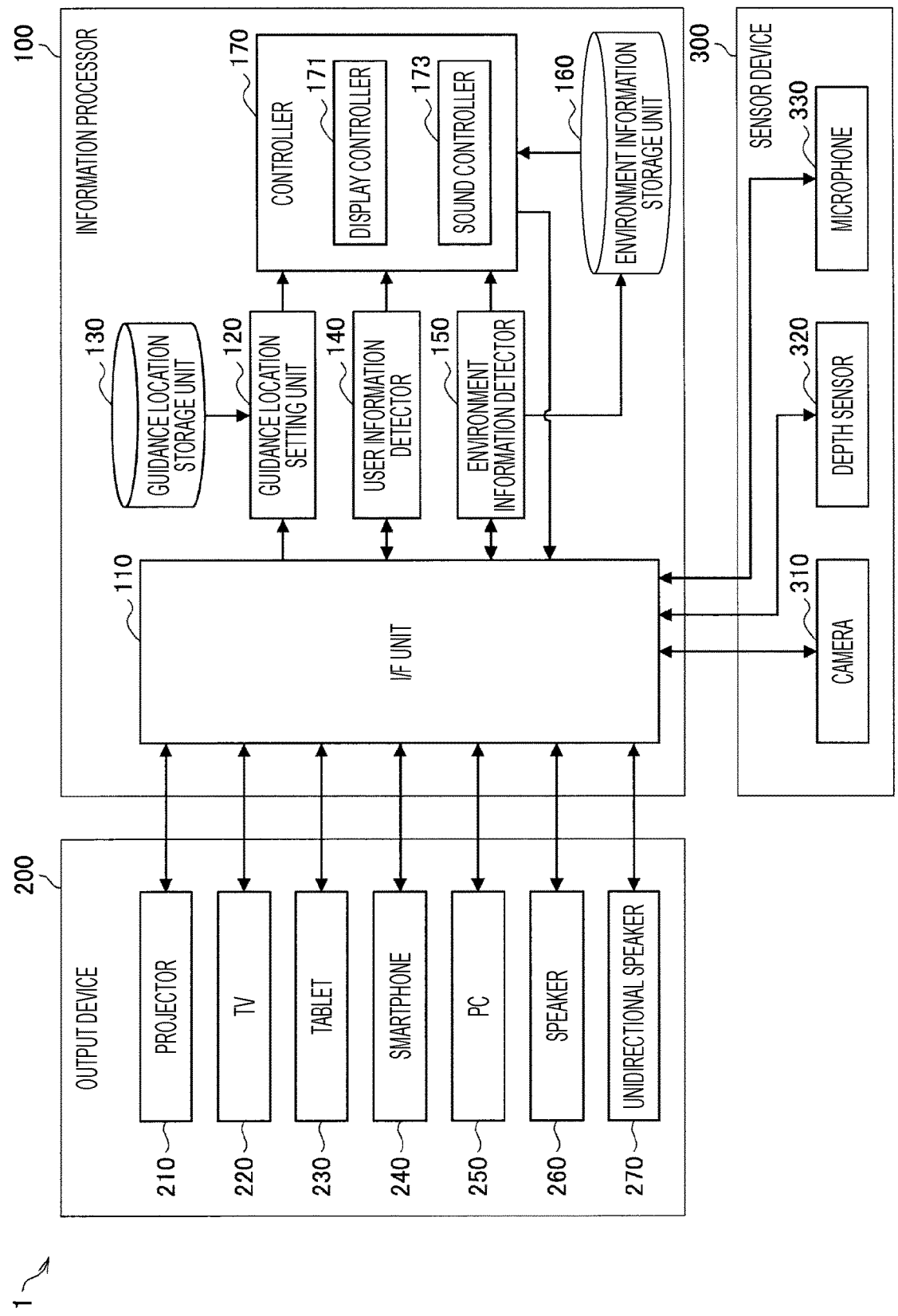
FIG. 2 is a block diagram showing an example of a configuration of the system according to the embodiment.

FIG. 2 is a block diagram showing an example of a configuration of the system 1 according to the embodiment. As shown in FIG. 2, the system 1 includes the information processor 100, the output device 200, and the sensor device 300.

(1) Output Device 200

The output device 200 includes a projector 210, a TV 220, a tablet 230, a smartphone 240, a PC 250, a speaker 260, and a unidirectional speaker 270. Note that the system 1 may include, as the output device 200, one or more of these components in combination, or may include multiple devices of the same type.

The projector 210 is a projection device that projects an image on any location in a space. The projector 210 may be, for example, a fixed wide-angle projector, or may be a so-called moving projector provided with a movable portion, such as a Pan/Tilt drive type portion, capable of changing the projection direction. The TV 220 is a device that receives radio waves of television broadcasting and outputs images and sound. The tablet 230 is a mobile device capable of wireless communication, which typically has a screen larger than that of the smartphone 240, and can output images, sound, vibration, and the like. The smartphone 240 is a mobile device capable of wireless communication, which typically has a screen smaller than that of the tablet 230, and can output images, sound, vibration, and the like. The PC 250 may be a fixed desktop PC or a mobile notebook PC, and can output images, sound, and the like. The speaker 260 converts audio data into an analog signal through a digital analog converter (DAC) and an amplifier, and outputs (reproduces) the signal. The unidirectional speaker 270 is a speaker capable of forming directivity in a single direction.

The output device 200 outputs information on the basis of control by the information processor 100. The information processor 100 can control an output method in addition to the content of information to be output. For example, the information processor 100 can control the projection direction of the projector 210, or control the directivity of the unidirectional speaker 270. In addition, the output device 200 reports, to the information processor 100, that notification information for the user is generated by an external factor.

Note that the output device 200 may include any component capable of output other than the components described above. For example, the output device 200 may include wearable devices such as a head mounted display (HMD), an augmented reality (AR) glass, and a watch-type device.

(2) Sensor Device 300

The sensor device 300 includes a camera 310, a depth sensor 320, and a microphone 330.

The camera 310 is an image pickup device such as an RGB camera that has a lens system, a drive system, and an imaging device, and picks up an image (still image or moving image). The depth sensor 320 is a device that obtains depth information such as an infrared distance measuring device, an ultrasonic distance measuring device, laser imaging detection and ranging (LiDAR), and a stereo camera. The microphone 330 is a device that collects surrounding sound and outputs audio data converted into a digital signal through an amplifier and an analog digital converter (ADC).

The sensor device 300 senses information on the basis of control by the information processor 100. For example, the information processor 100 can control the zoom ratio and the image pick up direction of the camera 310.

Note that the sensor device 300 may include any component capable of sensing other than the components described above. For example, the sensor device 300 may include a device such as a mouse, a keyboard, a touch panel, a button, a microphone, a switch, or a lever, which allows the user to input information. Additionally, the sensor device 300 may include various sensors, such as an acceleration sensor, a gyro sensor, a geomagnetic sensor, an optical sensor, an illuminance sensor, and a force sensor.

(3) Information Processor 100

The information processor 100 includes an interface (I/F) unit 110, a guidance location setting unit 120, a guidance location storage unit 130, a user information detector 140, an environment information detector 150, an environment information storage unit 160, and a controller 170.

I/F Unit 110

The I/F unit 110 is a connection device for connecting the information processor 100 and other devices. The I/F unit 110 is implemented by, for example, a universal serial bus (USB) connector or the like, and performs input/output of information to/from each component of the output device 200 and the sensor device 300.

Guidance Location Setting Unit 120

The guidance location setting unit 120 sets a guidance location.

The guidance location setting unit 120 may set in advance a guidance location corresponding to a predetermined trigger. For example, the guidance location setting unit 120 sets a location of a light switch as a guidance location corresponding to the user's return home. With this setting, the system 1 guides the user from an entrance to the location of the light switch in a case where the user comes home at night. Thus, the system 1 can notify the user of preset information that the user should notice. Note that the guidance location may be set by the user or may be set by the system 1 side.

The guidance location setting unit 120 may set, as a guidance location, a location corresponding to notification information generated for the user. For example, in a case where an incoming call is received or a mail is received on the smartphone of the user, the guidance location setting unit 120 sets the location of the smartphone as a guidance location. With this setting, the system 1 guides the user to the location of the smartphone that has received an incoming call or received a mail. In addition, for example, in a case where information linked to an everyday activity, such as rainfall notification based on a sudden weather change, cooking timer notification, or visitor notification such as an intercom, is presented, the guidance location setting unit 120 sets, as guidance information, the location where the information is presented. Note that such information may be presented as a part of information that is constantly presented by an ultra-short focus projector, for example. For example, the system 1 guides the user to a location where such information is presented, in a case where information linked to an everyday activity to be noted is presented. Thus, even in a case where information that the user should notice is suddenly generated, the system 1 can notify the user of the information.

Note that the output device 200 can output information on the basis of control by the system 1, and can also output information on the basis of an external factor. Then, the outputting of information on the basis of an external factor may be reported from the output device 200 to the information processor 100, or may be detected through the sensor device 300. For example, the smartphone 240 may notify the information processor 100 that an incoming call has been received or that a mail has been received. The information processor 100 may also detect that an incoming call has been received or that a mail has been received, on the basis of the result of audio recognition of a ring tone or the result of image recognition of a screen. It goes without saying that, in a case where a device not connected to the information processor 100 outputs information on the basis of an external factor, the location of the device may be set as a guidance location.

Guidance Location Storage Unit 130 The guidance location storage unit 130 stores the guidance locations. In particular, the guidance location storage unit 130 stores combinations of a predetermined trigger and a corresponding guidance location.

User Information Detector 140

The user information detector 140 has a function of detecting user information on the basis of information sensed by the sensor device 300. User information is information regarding a user.

User information may include information indicating a position of the user in a space sensed by the sensor device 300. The position of the user may be detected by a thermo camera, an RGB camera, an infrared sensor, an ultrasonic sensor or the like.

User information may include information indicating the user's line of sight. Information indicating the user's line of sight includes information indicating a position of the point of view and a direction of the line of sight. In addition, information indicating the user's line of sight may be information indicating the orientation of the face or head of the user, or may be information indicating the orientation of the eyeball. Information indicating the user's line of sight may be detected by analyzing an image of the eye of the user obtained by an RGB camera, an infrared camera, or an eyepiece camera or the like attached to the user.

User information may include information indicating the posture of the user. Information indicating the posture of the user may be detected by analyzing an image obtained by an RGB camera, an infrared camera, or the like.

Environment Information Detector 150

The environment information detector 150 has a function of detecting environment information on the basis of information sensed by the sensor device 300. Environment information is information regarding the space in which the user is located. Environment information may include various information.

Environment information may include information indicating the shape of the space in which the user is located. Information indicating the shape of a space includes information indicating the shape of an object forming the space, such as a wall surface, a ceiling, a floor, a door, furniture, and household items, for example. Information indicating the shape of a space may be two-dimensional information, or may be three-dimensional information such as a point cloud. Information indicating the shape of a space may be detected on the basis of depth information obtained by infrared distance measurement, ultrasonic distance measurement, or a stereo camera, for example.

Environment information may include information indicating a state of the projection surface. A state of the projection surface refers to an unevenness or a color of the projection surface, for example. An unevenness of the projection surface can be detected on the basis of depth information obtained by LiDAR, for example. A color of the projection surface may be detected by analyzing an image picked up by an RGB camera, for example.

Environment information may include information indicating a brightness of the projection surface. A brightness of the projection surface may be detected by an illuminance sensor or an RGB camera.

Environment information may include information indicating the position of an object in a space. For example, the position of a cup, a chair, a table, electronic equipment, or the like in a room may be detected by image recognition. Additionally, for example, a position of the smartphone in a room may be detected by the radio field intensity related to communication between the smartphone and a wireless LAN access point.

The environment information detector 150 outputs the detected environment information to the environment information storage unit 160 and the controller 170.

Environment Information Storage Unit 160

The environment information storage unit 160 stores environment information detected by the environment information detector 150.

Controller 170

The controller 170 controls the overall operation in the information processor 100 in accordance with various programs. The controller 170 includes a display controller 171 and a sound controller 173. The display controller 171 controls display by the output device 200. The sound controller 173 controls audio output by the output device 200.

The controller 170 functions as a guidance controller that controls guidance processing on the basis of information obtained from the guidance location setting unit 120, the guidance location storage unit 130, the user information detector 140, and the environment information detector 150 or the environment information storage unit 160. Specifically, the controller 170 causes the output device 200 to output guidance information for guiding the user to the guidance location, on the basis of environment information and user information.

In particular, in the embodiment, the controller 170 causes the projector 210 to project, to the space in which the user is located, guidance information for guiding the user to the guidance location, on the basis of environment information and user information. Here, guiding the user includes multiple ways of guiding such as guiding the user's line of sight, guiding the user's movement, and guiding the user's posture, for example. At the time of guidance, the controller 170 may associate another output with projection, so as to cause, for example, the speaker 260 to also output guidance information. Note that while the present specification describes an example in which the guidance information is output by at least the projector 210, the guidance information may be output by the TV 220 or the like, or may be AR-displayed by an HMD or the like.

The controller 170 switches the method of guiding the user on the basis of at least one of environment information or user information. Specifically, the controller 170 switches at least one of a guidance route, an output modal interface (e.g., mode of output device 200), or the content of guidance information. As a result, the system 1 can perform appropriate guidance according to the state of the user and the state of a space.

Guidance Route

The controller 170 determines a projection route of guidance information on the basis of at least one of environment information or user information. A projection route is a set of projection locations of guidance information. For example, the controller 170 determines a projection route including, as a start point, a surface in the direction of the user's current line of sight or a surface assumed to be at least in the field of view, and including, as an end point, a surface corresponding to the guidance location. The end point does not necessarily have to coincide with the guidance location, and a door may be an end point if the guidance location is beyond the door, for example. For example, in a case where guidance information is projected, the guidance information is projected so as to move along the projection route. Information regarding the projection route to be determined includes at least the information associated with a start point position and an end point position, and may additionally include information associated with the position of one or more passing points.

The controller 170 may determine the projection route by avoiding a region unsuitable as a projection location of guidance information. For example, the controller 170 determines the projection route so as to avoid a region that does not meet criteria for visibility of guidance information, among regions included in the space in which the user is located (surface of object forming a space such as wall, floor, and furniture, i.e., region that is candidate for projection location). Specifically, the controller 170 classifies regions included in the space in which the user is located into a region that meets the criteria for visibility of guidance information and a region that does not, on the basis of information regarding the space and object in the space detected by the environment information detector 150. Thereafter, the controller 170 determines the projection route such that a region meeting the visibility criteria is included as a projection location in the projection route, and a region not meeting the visibility criteria is not included as a projection location in the projection route. The visibility criteria are criteria (e.g., threshold) related to at least one of pieces of information that may influence visibility of projected guidance information, such as transparency (i.e., transmittance), reflectance, luminance, color, or positional relationship with the user of a region. The controller 170 determines the projection route on the basis of: detection information related to at least one of transparency, reflectance, luminance, color, positional relationship with the user, or the like of each region included in the space in which the user is located; and the visibility criteria. A specific description of the visibility criteria will be given. A region that meets the visibility criteria is, for example, a region where a predetermined luminance or more can be ensured for the guidance information in a case where the guidance information is projected as well as a region which is not transparent or black. Moreover, a region that does not meet the visibility is, for example, either a region where a predetermined luminance or more cannot be ensured for the guidance information in a case where the guidance information is projected or a region which is transparent or black. This is because in a case where the luminance of the guidance information is too low or the projection surface is transparent or black, for example, it may be difficult to view the projected guidance information. In addition, in some positional relationships between the projector 210 and the user, it is difficult to project guidance information on a portion hidden by the user. For this reason, the controller 170 determines, as a region that does not meet the criteria for visibility of guidance information, a region which is a blind spot for the user, such as a part of the body including the back or the like of the user and the ceiling immediately above the user, on the basis of the position of the projector of the output device 200 and the position of the user, for example, and determines the projection route so as to avoid such a region. As a result, the user can easily visually recognize the guidance information and be guided.

The controller 170 may change the projection location of guidance information in stages by tracking the user's line of sight. First, the controller 170 projects guidance information on a surface in the direction of the user's line of sight, using the surface as a projection location, so as to make the user aware of the projection in early stage. Then, the controller 170 guides the user by moving the guidance information toward the guidance location on the projection route, that is, changing the projection location, by tracking the user's line of sight. The projection location may be changed continuously (i.e., small change amount) or may be changed discretely (i.e., large change amount). As a result, the user can be guided to the guidance location by shifting the line of sight according to the movement of the guidance information.

The controller 170 may change the projection location of guidance information in stages by tracking the user's position. For example, when the user approaches the projection location, the controller 170 changes the projection location to a location on the projection route closer to the guidance location than the current projection location. This enables the system 1 to prompt the user to move to the guidance location.

The controller 170 may change the projection location of guidance information by changing the projection direction of the projector 210, which is a so-called moving projector. This allows the system 1 to use many locations in the space as the projection location.

Modal

The controller 170 determines what device the controller 170 shall cause to output guidance information, that is, a modal, on the basis of at least one of environment information or user information. For example, in a case where the user's face is close to a wall and it is difficult to project the guidance information in the field of view, the controller 170 causes the speaker 260 to output guidance information. Thus, the system 1 is able to guide the user through various output means.

Content of Guidance Information

Various contents of guidance information are conceivable. An example will be described below.

For example, the guidance information may include information indicating the degree of urgency. This point will be described with reference to FIG. 3.

Figure 3:
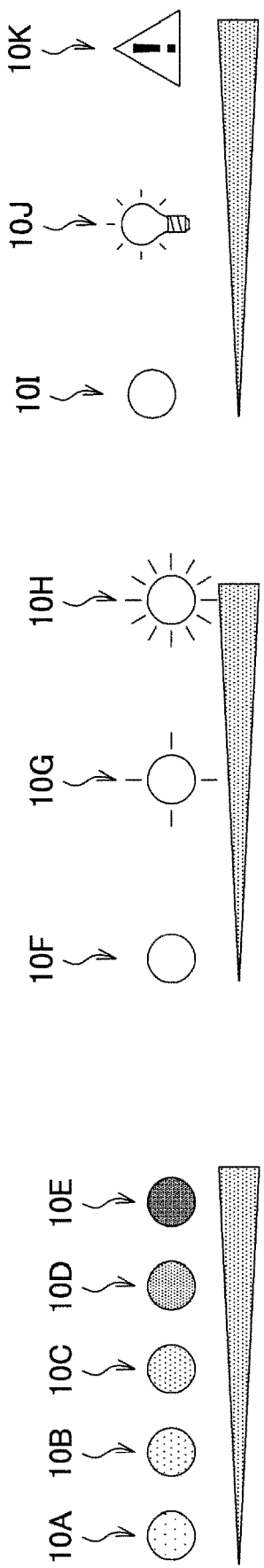
FIG. 3 is a diagram showing an example of guidance information projected by the system according to the embodiment.

FIG. 3 is a diagram showing an example of guidance information projected by the system 1 according to the embodiment. The guidance information 10A to 10K shown in FIG. 3 is an example of guidance information including information indicating the degree of urgency. Specifically, the guidance information 10A to 10E expresses the degree of urgency in color. Here, the higher the urgency is, the darker the color is. The guidance information 10F to 10H expresses the degree of urgency in animation. Here, the higher the urgency is, the faster the blinking is. The guidance information 10I to 10K expresses the degree of urgency by icons. Here, the higher the degree of urgency is, the stronger warning impression the icon poses.

For example, the guidance information may include information indicating a guidance direction. This point will be described with reference to FIG. 4 to FIG. 6.

Figure 4:
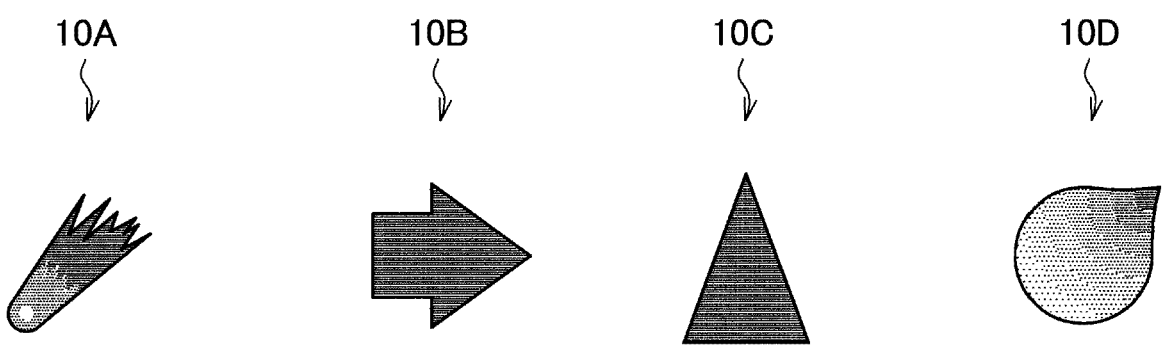
FIG. 4 is a diagram showing an example of guidance information projected by the system according to the embodiment.

FIG. 4 is a diagram showing an example of guidance information projected by the system 1 according to the embodiment. The guidance information 10A to 10D shown in FIG. 4 is an example of guidance information including information indicating a guidance direction. Specifically, the guidance information 10A is a tailing expression like a meteor, and expresses the guidance direction as a point where the meteor is headed. The guidance information 10B is an arrow expression, and expresses the guidance direction as the direction of the arrow. The guidance information 10C is a triangular expression, and expresses the guidance direction as the direction of the most pointed apex of the triangle. The guidance information 10D is a gradation expression in which color, brightness, transparency, or thickness is changed with respect to the guidance direction, and the guidance direction is expressed as a direction from a lighter side to a darker side of the gradation.

Figure 5:
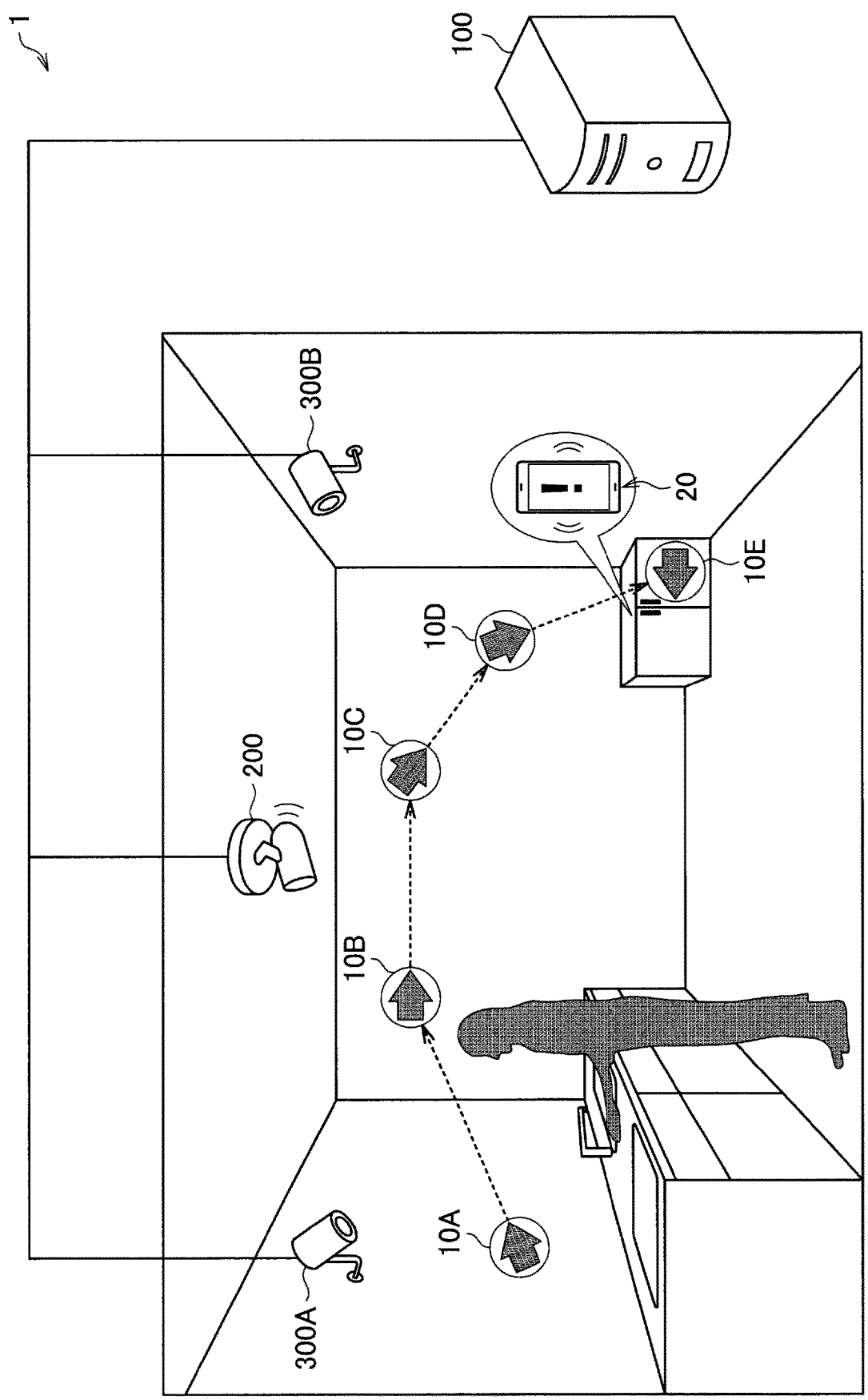
FIG. 5 is a diagram showing an example of guidance information projected by the system according to the embodiment.

FIG. 5 is a diagram showing an example of guidance information projected by the system 1 according to the embodiment. FIG. 5 shows an example in which the guidance processing is performed using the guidance information of the arrow expression. As shown in FIG. 5, the system 1 projects the guidance information 10A on a wall in the direction of the user's line of sight, using the wall the projection location, so as to make the user aware of the projection in early stage. Then, the system 1 projects the guidance information 10B to 10E in stages by following the user's line of sight. Here, each of the guidance information 10A to 10D indicates the direction of the projection location of guidance information to be projected next (e.g., guidance information 10B for guidance information 10A) by an arrow. This makes it possible to direct the user's line of sight to the point of the arrow, and to easily guide the user to the guidance information to be projected next. Moreover, the guidance information 10E projected last indicates the position of the smartphone 20 by an arrow. This makes it possible to easily guide the user to the cabinet in which the smartphone 20 is stored.

Figure 6:
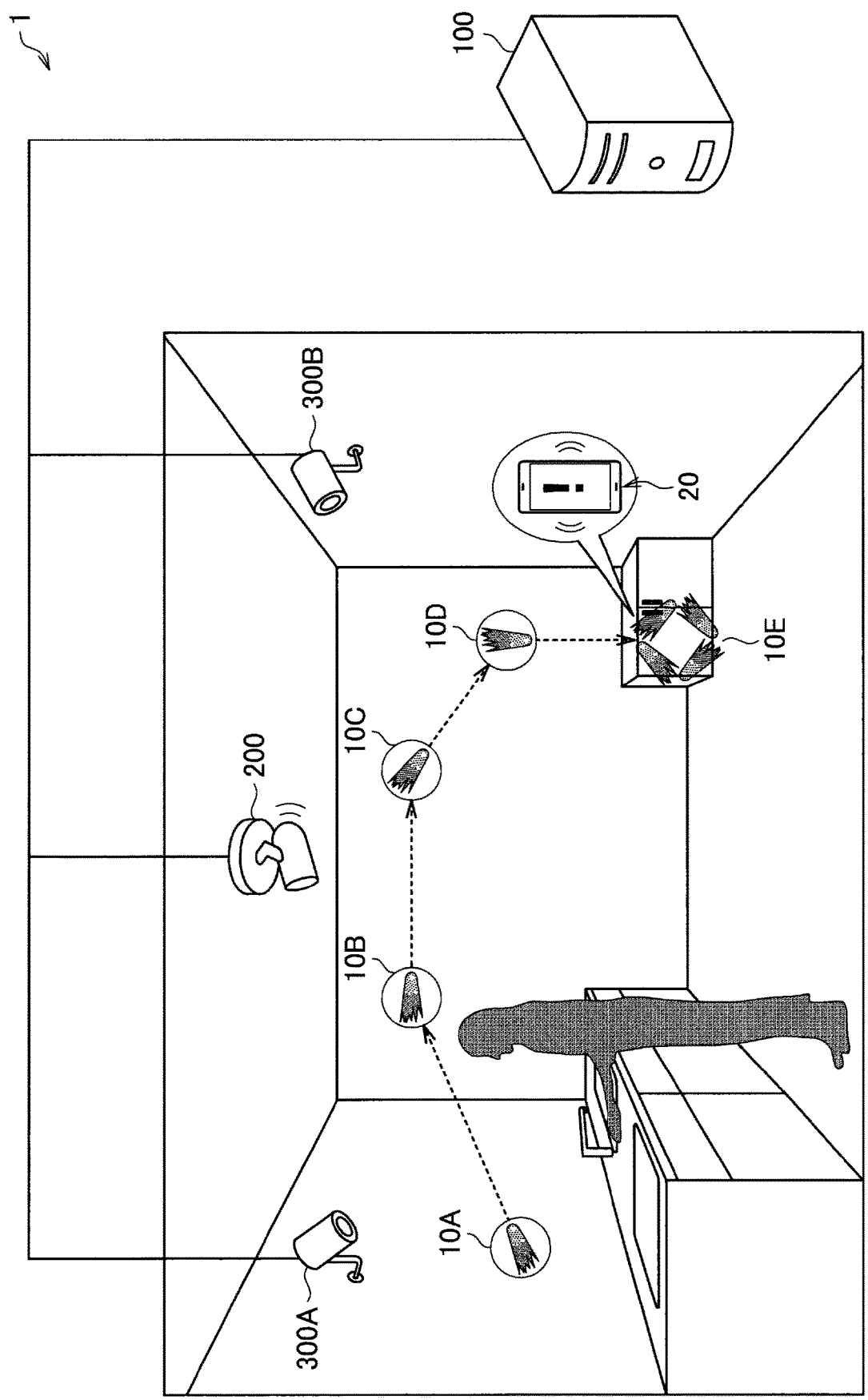
FIG. 6 is a diagram showing an example of guidance information projected by the system according to the embodiment.

FIG. 6 is a diagram showing an example of guidance information projected by the system 1 according to the embodiment. FIG. 6 shows an example in which the guidance processing is performed using the guidance information like a meteor. As shown in FIG. 6, the system 1 projects the guidance information 10A on a wall in the direction of the user's line of sight, using the wall as the projection location, so as to make the user aware of the projection in early stage. Then, the system 1 projects the guidance information 10B to 10E in stages by following the user's line of sight. Here, each of the guidance information 10A to 10D indicates the direction of the projection location of guidance information to be projected next (e.g., guidance information 10B for guidance information 10A) in the direction in which the meteor is headed. This makes it possible to direct the user's line of sight to the direction in which the meteor is headed, and to easily guide the user to the guidance information to be projected next. Moreover, the guidance information 10E projected last is shown by an expression surrounding the position of the smartphone 20. This makes it possible to easily guide the user to the cabinet in which the smartphone 20 is stored.

For example, the guidance information may include information indicating an action to be performed by the user for guidance. For this reason, the controller 170 determines an action to be performed by the user, on the basis of at least one of environment information or user information. For example, in a case where the guidance location is a location that is difficult to visually recognize from the height of the point of view of the user unless the user bends forward, guidance information for prompting the user to bend forward is determined. Additionally, in a case where the guidance location is in a room different from the room in which the user is located, guidance information prompting to move to the different room is determined. Thus, the system 1 can guide not only the user's line of sight but also actions such as movement and posture. Hereinafter, guidance information including information indicating an action to be performed by the user for guidance will be described with reference to FIG. 7 and FIG. 8.

Figure 7:
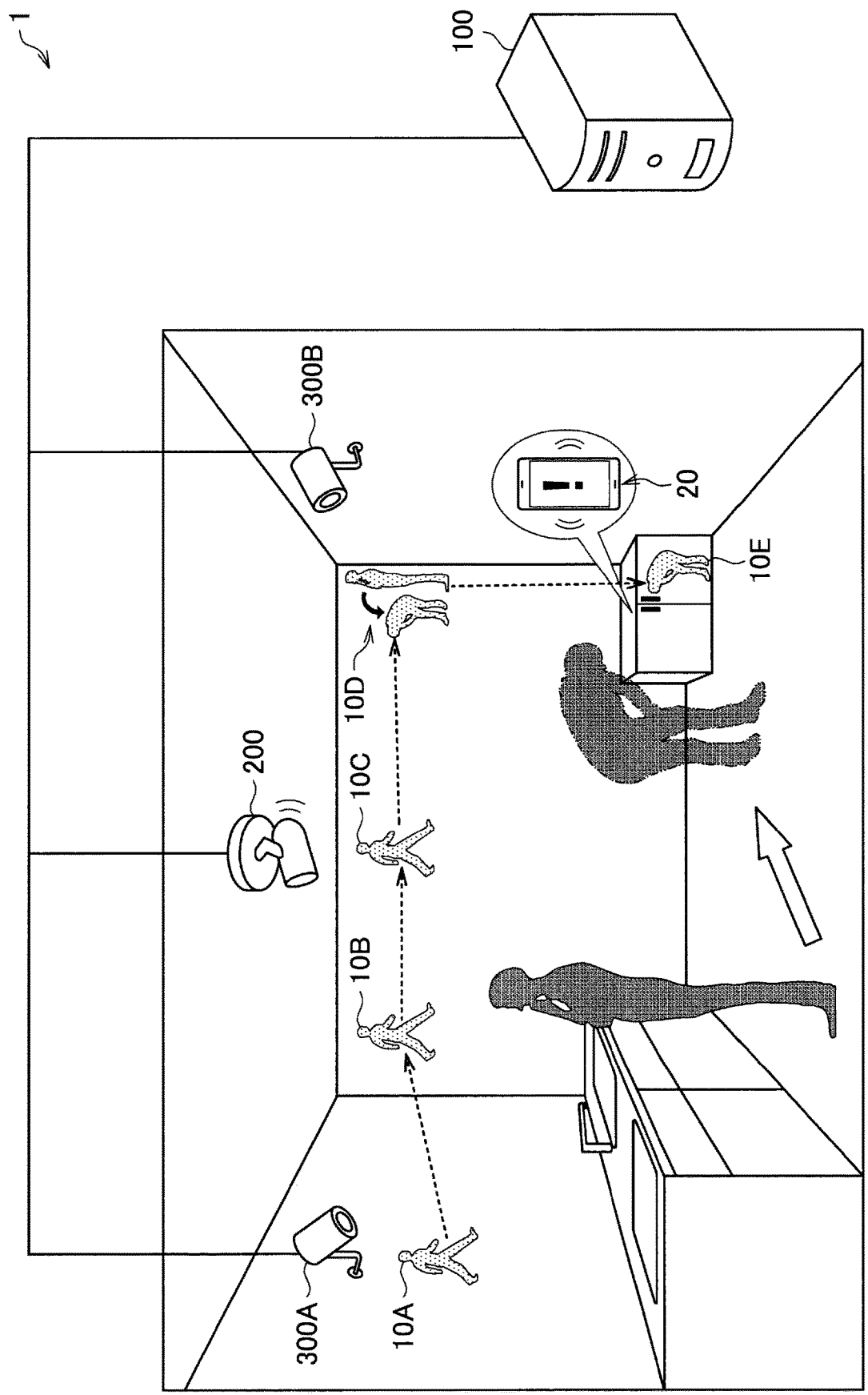
FIG. 7 is a diagram showing an example of guidance information projected by the system according to the embodiment.

FIG. 7 is a diagram showing an example of guidance information projected by the system 1 according to the embodiment. FIG. 7 shows an example in which the guidance processing is performed using guidance information including information indicating an action to be performed by the user for guidance. The system 1 moves the user to the vicinity of the cabinet in which the smartphone 20 is stored, by projecting the guidance information 10A to 10C which is a walking character, while changing the projection location according to the movement of the user. Next, when the system 1 recognizes that the user has moved to a position where the user needs to change posture, the system 1 gives postural guidance to the user to bend forward by projecting the guidance information 10D, which is a character (animation) performing the action of bending forward. The system 1 then guides the user to the guidance location by projecting the guidance information 10E. This enables the system 1 to guide the user to a location that is difficult to visually recognize unless the user moves and bends forward.

Figure 8:
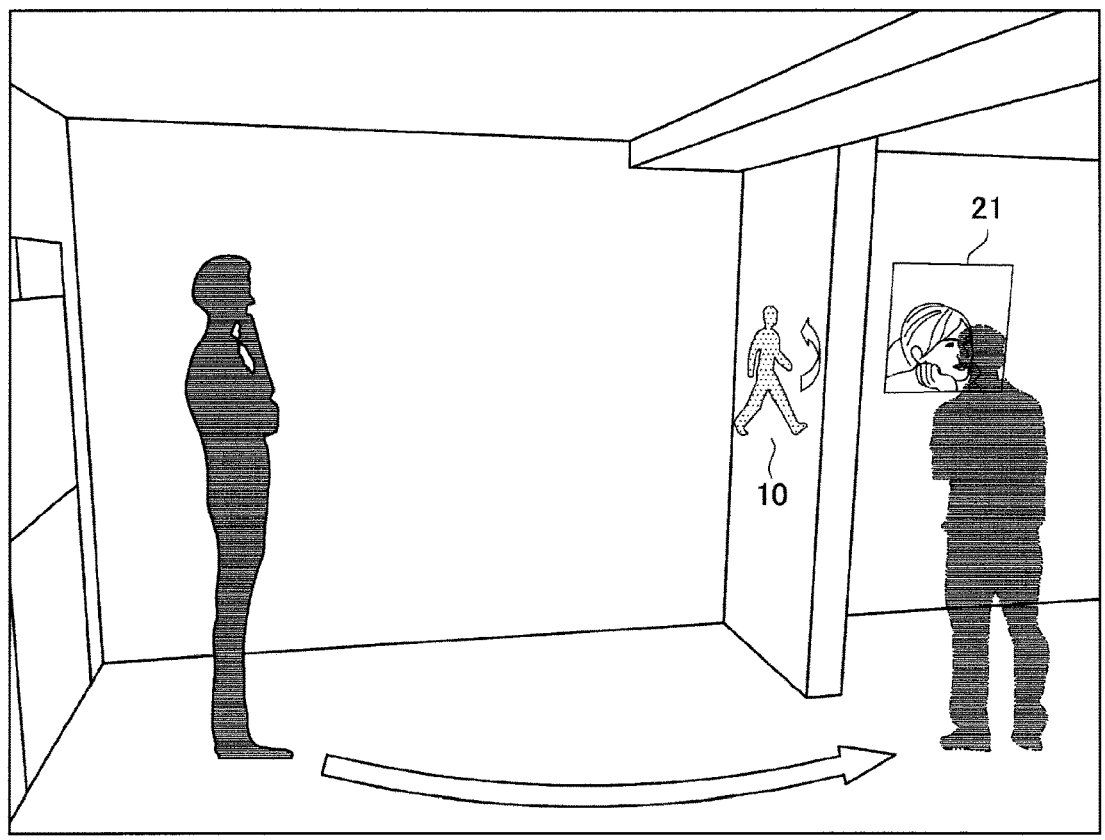
FIG. 8 is a diagram showing an example of guidance information projected by the system according to the embodiment.

FIG. 8 is a diagram showing an example of guidance information projected by the system 1 according to the embodiment. FIG. 8 shows an example in which the guidance processing is performed using guidance information including information indicating an action to be performed by the user for guidance. Referring to FIG. 8, guidance information 10 that prompts the user to move around a wall and move to the next room is projected on the wall of a room where the user is currently in. The guidance information 10 may be an animation. In the living space, it is highly likely that there is a shield such as a wall of a room. Under such circumstances, there may be information that the user should notice in a location shielded by the shield and not visible from the user's current location. In this case, the system 1 can guide the user to the guidance location by projecting the guidance information 10 prompting to move around the shield as shown in FIG. 8. In the example shown in FIG. 8, a screen 21 which is information that the user should notice is projected on a wall surface in the next room. The system 1 may start projection of the screen 21, triggered by the user having moved to the next room.

Such guidance that prompts the user to perform an action enables a wider range of guidance than guidance of only the line of sight. For example, in a use case where an object is searched indoors, the system 1 instructs the user about the approximate position and direction of the object to be searched, and further indicates the posture in a case where the user moves to the vicinity of the object to be searched. This makes it possible to notify the user of objects in places that are difficult to notice unless the user squats or looks inside. In addition, in a case where the surrounding area of the guidance location is a location inappropriate for projection, for example, by guiding the user's posture, it is possible to guide the user to the guidance location while avoiding projection onto the inappropriate location.

For example, guidance information may include information indicating the state of a guidance location in a representation in which a part of a shield is transparent. This point will be described with reference to FIG. 9.

Figure 9:
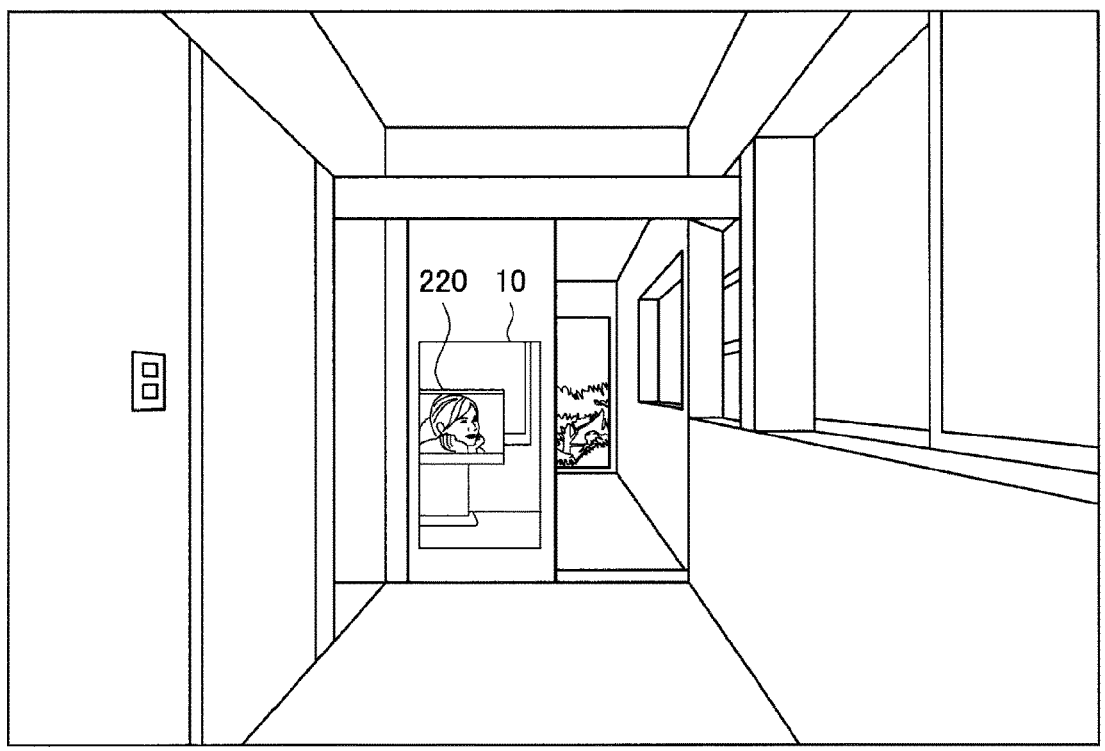
FIG. 9 is a diagram showing an example of guidance information projected by the system according to the embodiment.

FIG. 9 is a diagram showing an example of guidance information projected by the system 1 according to the embodiment. FIG. 9 shows an example in which the guidance processing is performed using guidance information including information indicating the state of a guidance location. It is assumed that the TV 220 is in the next room separated from a room in which the user is located, and the TV 220 displays information that the user should notice. In such a case, as shown in FIG. 9, the guidance information 10 is projected, which is an image showing the state of the TV 220 in the guidance location in a representation transmitted through a wall. This allows the user to notice that the guidance location is the TV 220 and that the TV 220 is displaying something.

The guidance information can be expressed in various ways other than that described above. An example will be described below.

The system 1 may dim the entire environment to project the guidance location brightly. This enables the user to easily view the guidance location.

The system 1 may change the expression of the guidance information in a case where the user acts as though he/she is not aware of the guidance. This makes it easier for the user to notice the guidance information.

In a case where there is no longer any information that the user should notice, the system 1 may delete the guidance information in a manner such as scattering the guidance information. This enables the user to recognize that there is no longer any information that should be noticed.

The system 1 may accept the user's guidance cancellation operation. For example, the system 1 may stop the projection of guidance information in a case where the user intentionally shifts his/her line of sight away the guidance information.

The system 1 may project guidance information only at the start point and the end point regarding information having high urgency. This eliminates the time for moving the projection location of the guidance information in stages, thereby enabling a more prompt guidance for the user.

In a case where there are multiple people in the space, the system 1 may guide the multiple people collectively, or may guide a person closest to the guidance location to the target. When one person is guided, other people can be guided accordingly.

The system 1 may give guidance by outputting a directional sound as the guidance information, without performing projection. The system 1 may give guidance by combining audio output and projection, as a matter of course.

The system 1 may output prior guidance information before projecting the guidance information for guiding the user to the guidance location. Prior output is output for creating a desired environment. For example, while a vacuum cleaner is being operated, audio output of the system 1 cannot be heard due to noise from the vacuum cleaner. Hence, the system 1 first outputs guidance information to turn off the vacuum cleaner. Thus, even in an environment where guidance is difficult, guidance can be made easy by adjusting the environment.

Modification

The present technology is also applicable to driving a car. For example, the system 1 may guide the line of sight of the user driving the car to a pedestrian. In this case, the output device 200 is a head-up display, for example, and the user information detector 140 detects body information including the direction of the car, the traveling direction, the vehicle speed, and the like in addition to user information.

The information processor 100 may be connected to the output device 200 and the sensor device 300 disposed multiple spaces through a network to perform guidance processing for different users. For example, the information processor 100 may direct the line of sight of multiple users in different spaces to the same place. Specifically, the information processor 100 may guide the line of sight of multiple users watching a sports game in the same stadium to a player who should be focused on.

3. PROCESSING FLOW

Figure 10:
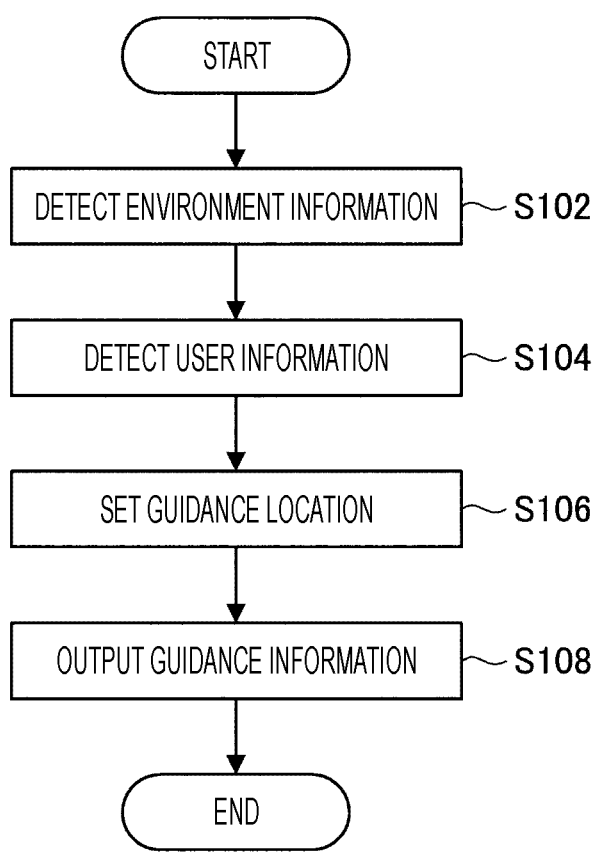
FIG. 10 is a sequence chart showing an example of the flow of guidance processing performed in the system according to the embodiment.
Figure 11:
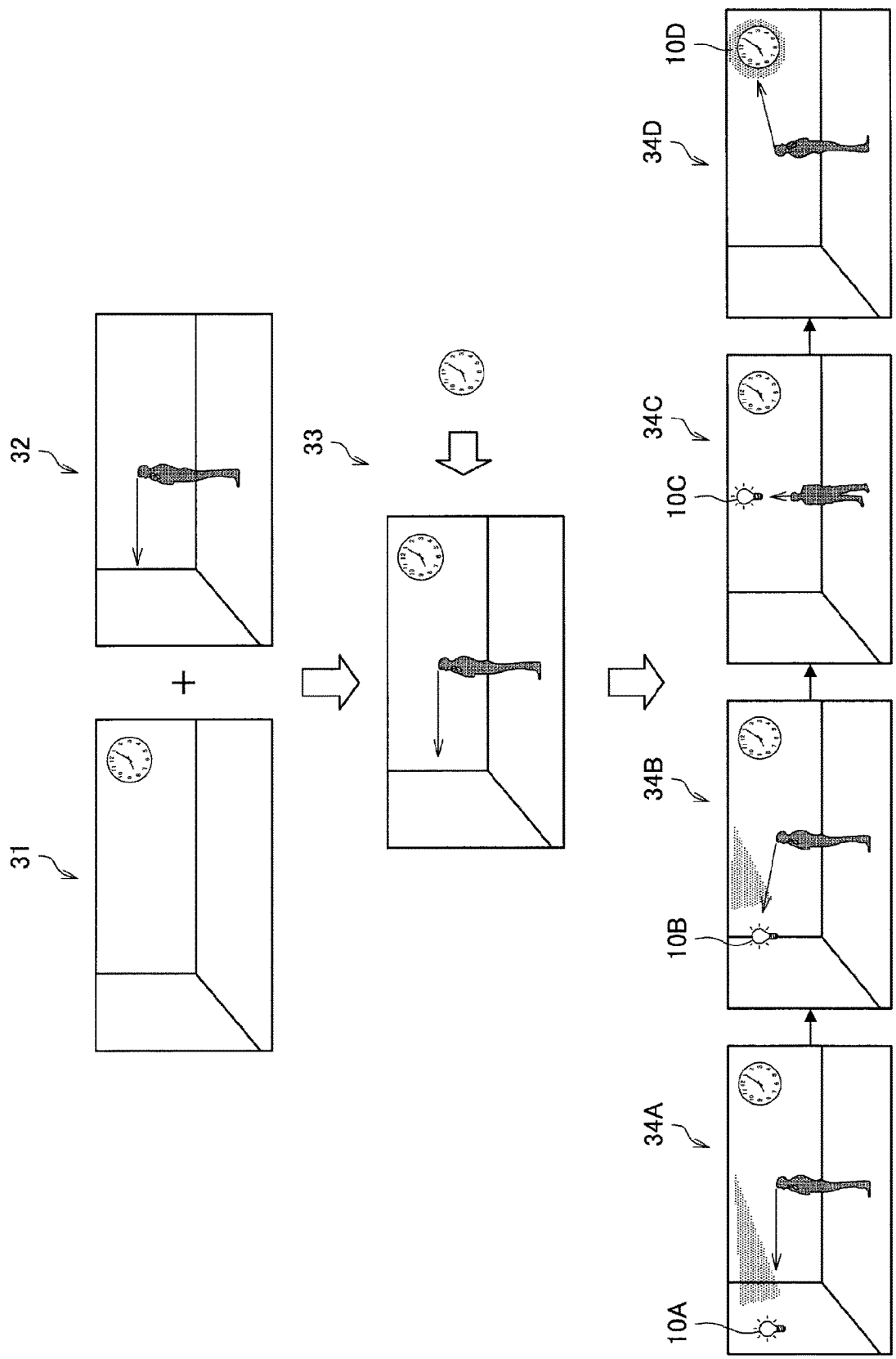
FIG. 11 is a diagram for describing an example of the flow of guidance processing performed in the system according to the embodiment.

Subsequently, an example of the flow of guidance processing according to the embodiment will be described with reference to FIG. 10 and FIG. 11. FIG. 10 is a sequence chart showing an example of the flow of guidance processing performed in each part of the information processor 100 of the system 1 according to the embodiment. FIG. 11 is a diagram for describing an example of the flow of guidance processing performed in the system 1 according to the embodiment.

As shown in FIG. 10, the system 1 first detects environment information (step S102). For example, as indicated by reference numeral 31 in FIG. 11, the system 1 detects, as environment information, the shape of a room and the fact that a clock is hung on a wall.

Next, the system 1 detects user information (step S104). For example, as indicated by reference numeral 32 in FIG. 11, the system 1 detects, as user information, the fact that the user is located in the center of the room and that the line of sight is directed to a wall different from the wall on which the wall is hung.

Next, the system 1 sets a guidance location (step S106). For example, as indicated by reference numeral 33 in FIG. 11, the system 1 sets the clock hung on the wall as a guidance location.

Then, the system 1 outputs the guidance information on the basis of at least one of the environment information or the user information (step S108). For example, as indicated by reference numeral 34A in FIG. 11, the system 1 projects the guidance information 10A on the wall in the direction of the user's line of sight, using the wall as the projection location, so as to make the user aware of the projection in early stage. Then, as indicated by reference numerals 34B to 34D in FIG. 11, the system 1 projects the guidance information 10B to 10D by tracking the line of sight and the position of the user, that is, moves the guidance information toward the guidance location. This makes it possible to guide the user's line of sight to the clock hung on the wall.

4. EXAMPLE

4.1. First Example

A first example relates to bouldering (specifically, AR bouldering). Hereinafter, the example will be described with reference to FIG. 12 and FIG. 13.

Figure 12:
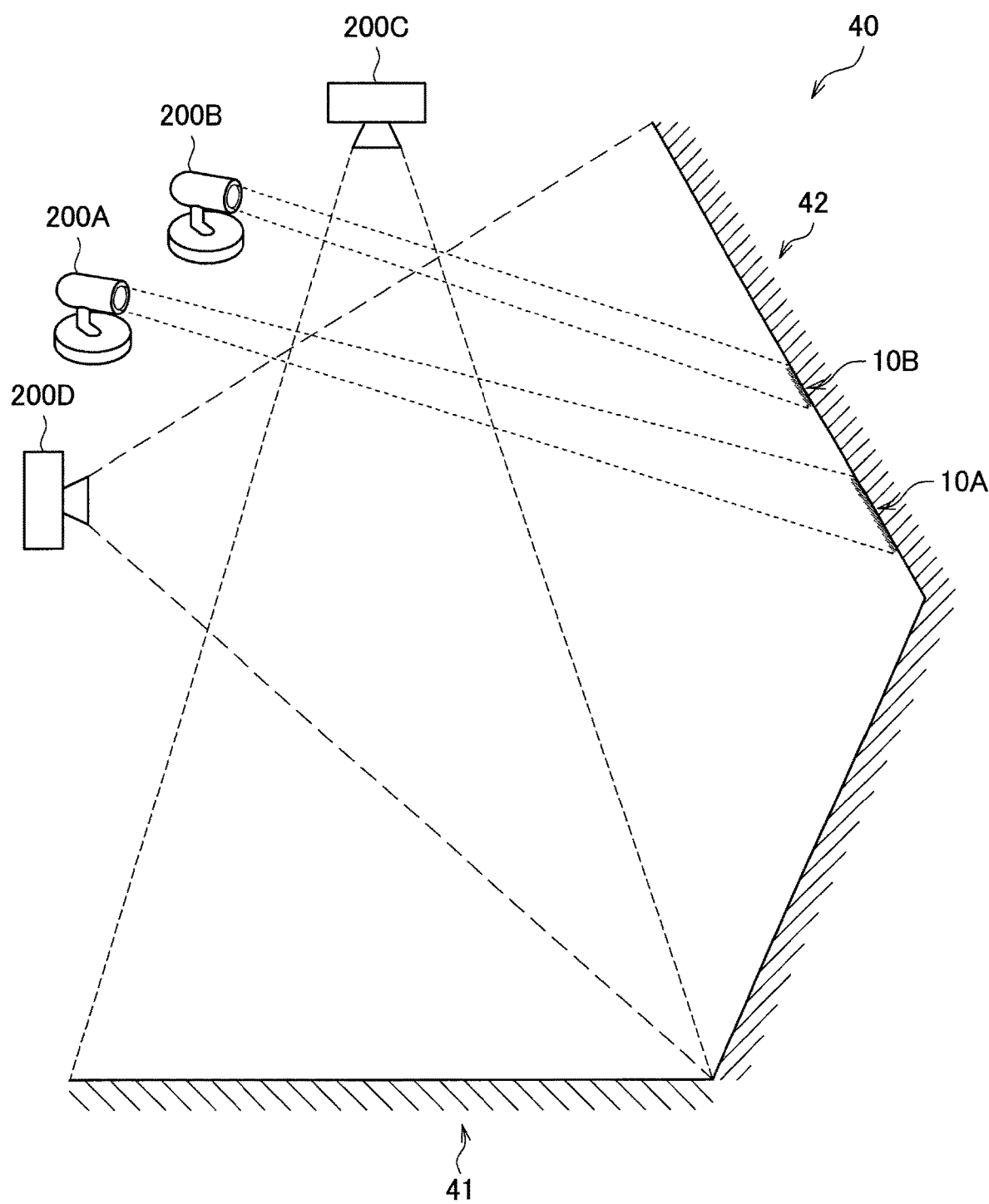
FIG. 12 is a diagram for describing a first example.
Figure 13:
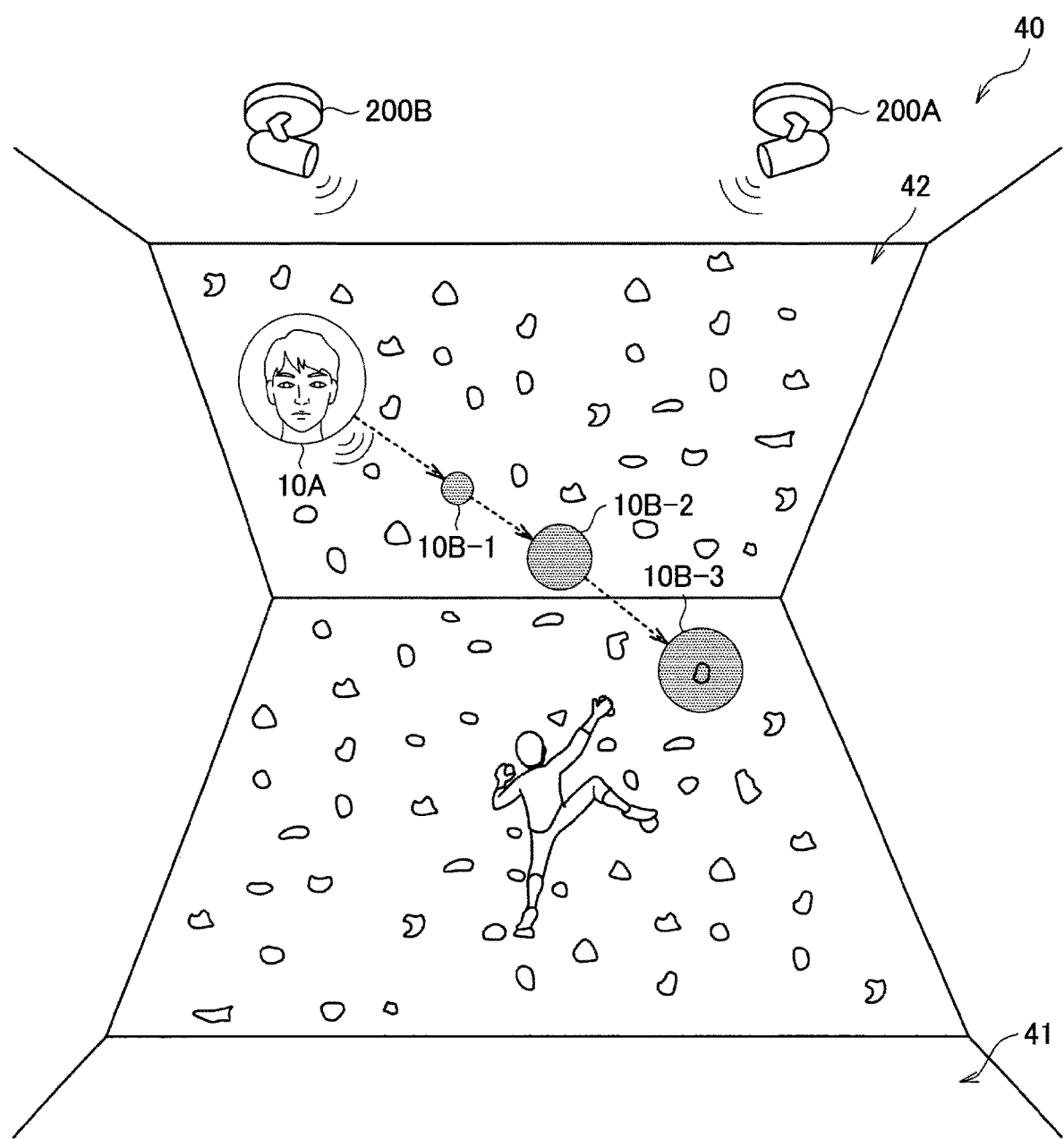
FIG. 13 is a diagram for describing the first example.

FIG. 12 and FIG. 13 are diagrams for describing the first example. As shown in FIG. 12, it is assumed that output devices 200A to 200D are installed in a bouldering facility 40. Illustration of a sensor device 300 and an information processor 100 is omitted. The user can climb a climbing wall 42 from a floor 41. The sensor device 300 senses information associated to the space of the bouldering facility 40 including the floor 41 and the climbing wall 42, and the user who climbs the climbing wall 42. The information processor 100 detects environment information and user information on the basis of the information sensed by the sensor device 300, and controls the output of the output devices 200A to 200D. The environment information here includes, for example, information indicating the shape, illuminance, and color of the floor 41 and the climbing wall 42, the position and shape of climbing holds provided on the climbing wall 42, and the like. Additionally, the user information here includes, for example, information indicating the position, posture, and line of sight of the user climbing the climbing wall 42, the distance between the user's face and the climbing wall 42, and the like.

In the example, the output devices 200C and 200D are fixed projectors that project onto a fixed projection region (i.e., projection location), and the output devices 200A and 200B are moving projectors that can move the projection region. The output device 200C and the output device 200D project (i.e., projection mapping) information which is a background on the floor 41 and the climbing wall 42, respectively. For example, by projecting an image of a building wall on the climbing wall 42 and an image of a landscape looking down to the ground from the building wall on the floor 41, it is possible to make the user feel as if he/she is climbing a building wall. Then, the output devices 200A and 200B can project guidance information 10A and 10B on the floor 41 or the climbing wall 42, and further on a side surface or ceiling other than the floor 41 or the climbing wall 42. In other words, the output devices 200A and 200B can project the guidance information while freely moving the projection location to any place in the space in the bouldering facility 40.

For example, as shown in FIG. 13, the output device 200A projects an image of an instructor who supports climbing of the user as the guidance information 10A. Here, since the user is climbing and the face is close to the climbing wall 42, the guidance information 10A is hard to come into view. In this case, a system 1 notifies the user of the guidance information 10A by outputting a sound from the audio output device such that the sound comes to the user from the direction of the projection location of the guidance information 10A. For example, as shown in FIG. 13, the system 1 outputs sound having directivity from the output device 200A, so that the sound reflected from the direction of the guidance information 10A arrives at the user. This makes it possible to give the user a feeling as if the instructor is speaking to the user. Alternatively, the system 1 may output sound from an unillustrated directional speaker in the direction of the guidance information 10A as viewed from the user.

Note that while the example shown in FIG. 13 shows a case where the guidance information 10A is projected on the climbing wall 42, the output device 200A may project the guidance information 10A on locations other than the climbing wall 42, such as the floor 41, and a side wall of the climbing wall 42 and the ceiling which are out of the projection regions of the output devices 200C and 200D. For example, in a case where any one or a start point, a passing point, and an end point of a projection route of the guidance information 10A or a combination thereof is set outside the projection region of the output devices 200C and 200D, since the guidance information 10A is projected outside the projection region of the output device 200D (i.e., the climbing wall 42), it is assumed that the user is less likely to notice the guidance information 10A. Even in such a case, the output device 200A or 200B, which is a moving projector, can project the guidance information 10A to guide the line of sight and help the user to notice the guidance display.

Further, the guidance information 10A may be handed over by cooperation of the fixed projector and the moving projector. For example, assume a case where the projection route of the guidance information 10A is determined to straddle the inside of the projection region of the fixed projector (e.g., floor 41 or climbing wall 42) and the outside of the projection region of the fixed projector (e.g., side wall or ceiling). In such a case, a controller 170 may control the output devices 200A to 200D such that the output device 200C or 200D projects the guidance information 10A in a case where the guidance information 10A is displayed within the projection region of the fixed projector, and the output device 200A and 200B project the guidance information 10A in a case where the guidance information 10A is displayed outside the projection region of the fixed projector. By performing control in this manner, the moving projector can project contents other than the guidance information 10A while the fixed projector is projecting the guidance information 10A, whereby the quality of entertainment can be improved.

The output device 200B also projects guidance information indicating a hold to be gripped next in order to support the user's climbing. For example, the output device 200B projects guidance information 10B-1 to 10B-3 in stages, by using the projection location of the guidance information 10A as a start point. In particular, the guidance information 10B-3 highlights the climbing hold to be gripped next. With this configuration, it is possible to guide the user's line of sight once attracted to the instructor to the guidance information 10D and to guide the user to the climbing hold to be gripped next.

4.2. Second Example

A second example relates to education. Hereinafter, the example will be described with reference to FIG. 14.

Figure 14:
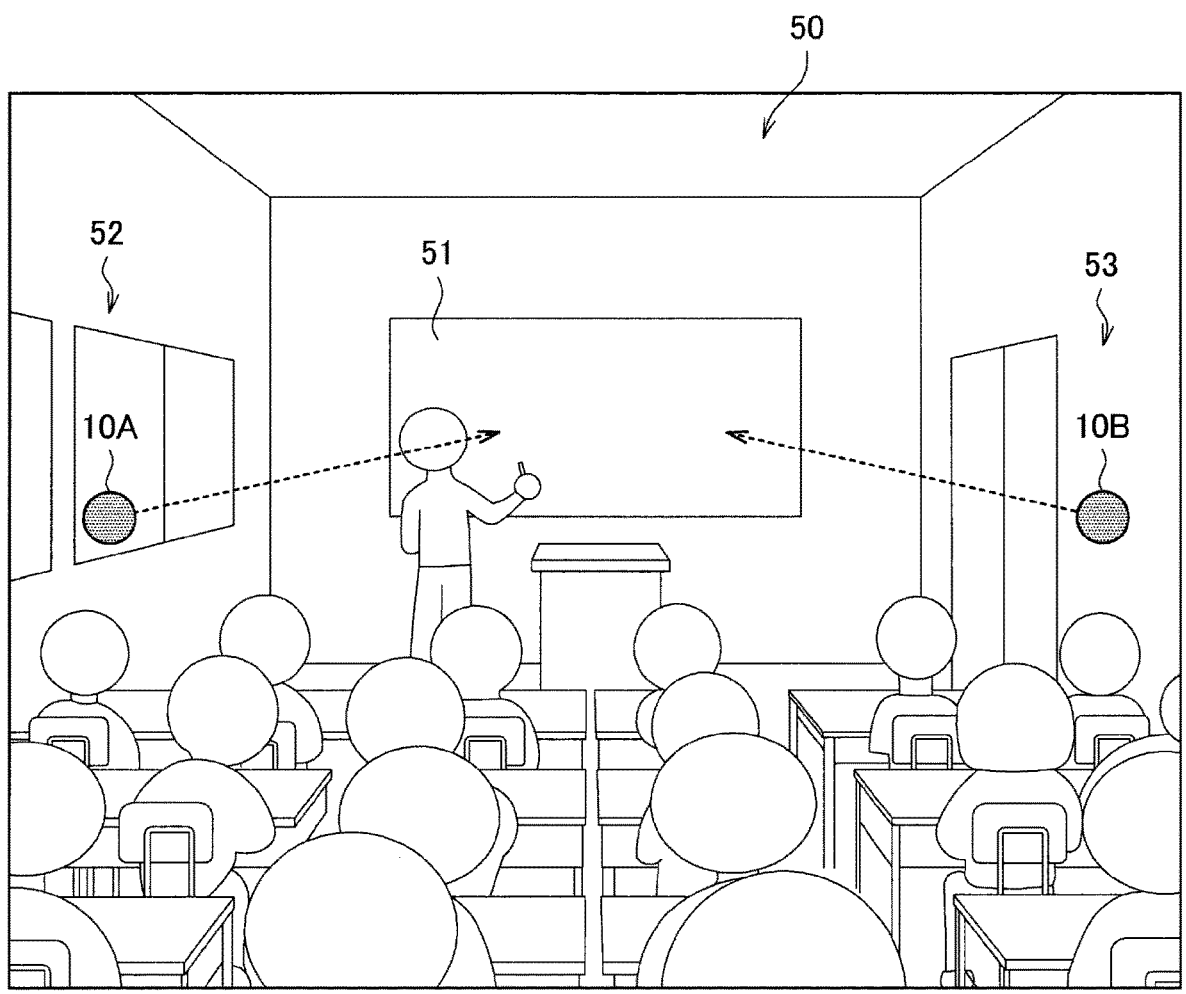
FIG. 14 is a diagram for describing a second example.

FIG. 14 is a diagram for describing the second example. As shown in FIG. 14, in a classroom 50, a teacher is teaching toward a blackboard 51. Note that in FIG. 14, illustration of an information processor 100, an output device 200, and a sensor device 300 is omitted. As shown in FIG. 14, multiple students are taking class. However, some students may be looking away to the direction of a window 52. In such a case, a system 1 can collect the line of sight of the students on the blackboard 51, by projecting while moving guidance information 10A toward the blackboard 51 by tracking the line of sight of the students. Similarly, in a case where some students are looking away to the direction of a wall 53, the system 1 can collect the line of sight of the students on the blackboard 51, by projecting while moving guidance information 10B toward the blackboard 51 by tracking the line of sight of the students.

5. HARDWARE CONFIGURATION EXAMPLE

Figure 15:
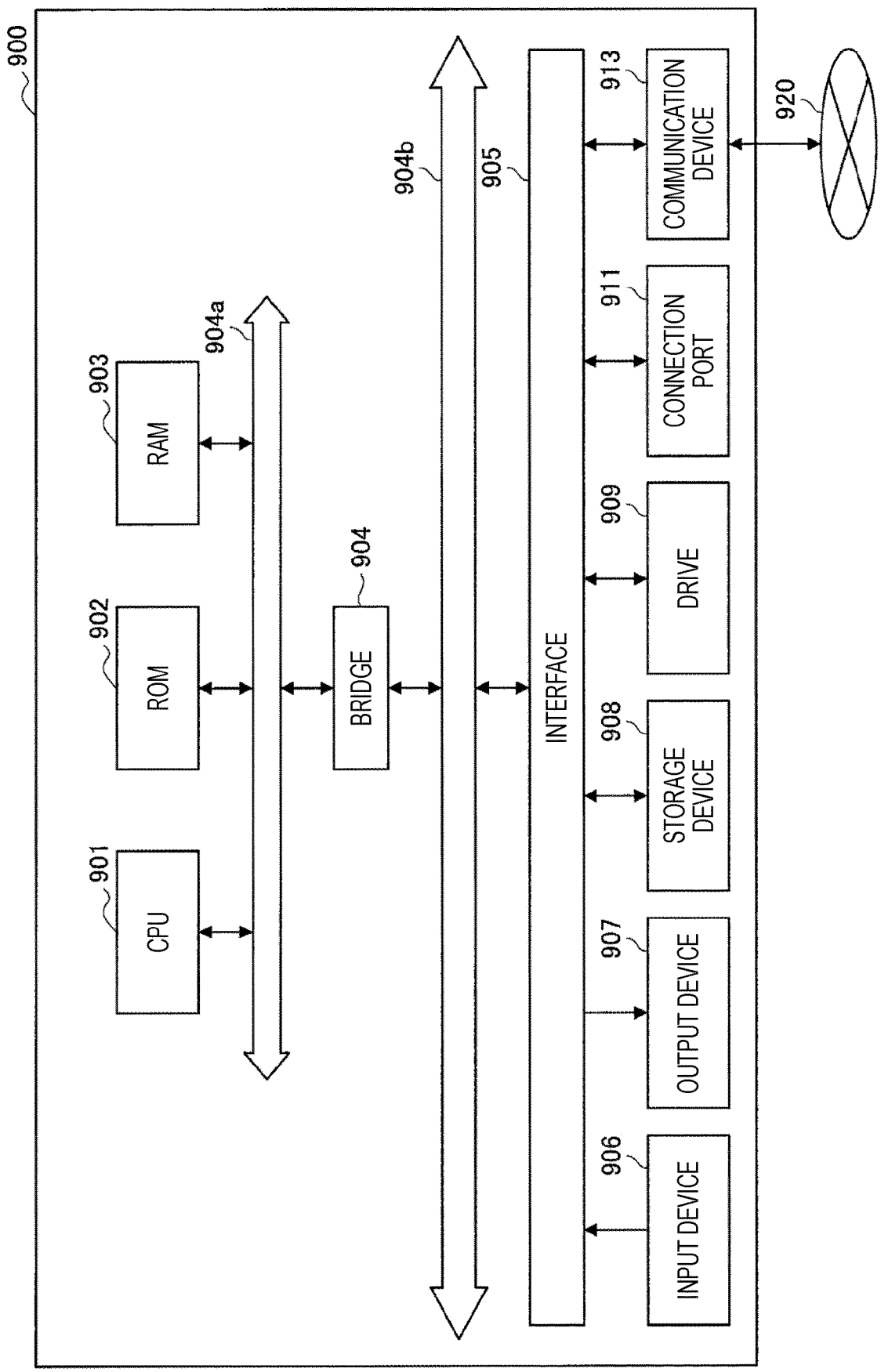
FIG. 15 is a block diagram showing an example of a hardware configuration of an information processor according to the embodiment.

Finally, a hardware configuration of an information processor according to the embodiment will be described with reference to FIG. 15. FIG. 15 is a block diagram showing an example of the hardware configuration of the information processor according to the embodiment. Note that an information processor 900 shown in FIG. 15 can implement the information processor 100 shown in FIG. 2, for example. Information processing by the information processor 100 according to the embodiment is achieved by cooperation of software and hardware described below.

As shown in FIG. 15, the information processor 900 includes a central processing unit (CPU) 901, a read-only memory (ROM) 902, a random access memory (RAM) 903, and a host bus 904a. The information processor 900 further includes a bridge 904, an external bus 904b, an interface 905, an input device 906, an output device 907, a storage device 908, a drive 909, a connection port 911, and a communication device 913. The information processor 900 may have a processing circuit such as an electric circuit, a DSP, or an ASIC, for example, instead of or in addition to the CPU 901.

The CPU 901 functions as an arithmetic processor and a controller, and controls the overall operation in the information processor 900 according to various programs. Additionally, the CPU 901 may be a microprocessor. The ROM 902 stores programs used by the CPU 901, operation parameters, and the like. The RAM 903 temporarily stores programs used in execution of the CPU 901, and parameters and the like that appropriately change in the execution. The CPU 901 can form, for example, the guidance location setting unit 120, the guidance location storage unit 130, the user information detector 140, the environment information detector 150, and the controller 170 shown in FIG. 2.

The CPU 901, the ROM 902, and the RAM 903 are mutually connected by the host bus 904a including a CPU bus and the like. The host bus 904a is connected to the external bus 904b such as a peripheral component interconnect/interface (PCI) bus through the bridge 904. Note that the host bus 904a, the bridge 904, and the external bus 904b do not necessarily have to be separately configured, and these functions may be implemented in one bus.

The input device 906 is implemented by a device into which information is input by the user, such as a mouse, a keyboard, a touch panel, a button, a microphone, a switch, and a lever, for example. Further, the input device 906 may be a remote control device using infrared rays or other radio waves, or may be an external connection device such as a mobile phone or a PDA corresponding to the operation of the information processor 900, for example. Furthermore, the input device 906 may include an input control circuit or the like that generates an input signal on the basis of information input by the user using the above input means, and outputs the generated input signal to the CPU 901, for example. The user of the information processor 900 can input various data into the information processor 900 and instruct processing operations by operating the input device 906.

The output device 907 includes a device capable of visually or aurally notifying the user of obtained information. Such devices include display devices such as CRT display devices, liquid crystal display devices, plasma display devices, EL display devices, laser projectors, LED projectors and lamps, audio output devices such as speakers and headphones, printer devices, and the like. The output device 907 outputs results obtained by various types of processing performed by the information processor 900, for example. Specifically, the display device visually displays the results obtained by the various types of processing performed by the information processor 900 in various formats such as text, images, tables, and graphs. On the other hand, the audio output device converts an audio signal including reproduced audio data, acoustic data, and the like into an analog signal and aurally outputs the analog signal.

The storage device 908 is a device for data storage formed as an example of a storage unit of the information processor 900. The storage device 908 is implemented by a magnetic storage unit device such as an HDD, a semiconductor storage device, an optical storage device, a magneto-optical storage device, or the like, for example. The storage device 908 may include a storage medium, a recording device that records data in the storage medium, a reading device that reads data from the storage medium, a deletion device that deletes data recorded in the storage medium, and the like. The storage device 908 stores programs executed by the CPU 901, various data, various data obtained from the outside, and the like. The storage device 908 may form the guidance location storage unit 130 and the environment information storage unit 160 shown in FIG. 2, for example.

The drive 909 is a reader/writer for a storage medium, and is built in or externally attached to the information processor 900. The drive 909 reads out information recorded in a removable storage medium such as a mounted magnetic disk, optical disk, magneto-optical disk, or semiconductor memory, and outputs the information to the RAM 903. The drive 909 can also write information to the removable storage medium.

The connection port 911 is an interface connected to an external device, and is a connection port to an external device capable of data transmission by universal serial bus (USB), or the like, for example. The connection port 911 may form the I/F unit 110 shown in FIG. 2, for example. In addition, the connection port 911 is connected to the output device 200 and the sensor device 300 shown in FIG. 2.

The communication device 913 is a communication interface including a communication device or the like for connecting to the network 920, for example. The communication device 913 is a communication card for wired or wireless local area network (LAN), long term evolution (LTE), Bluetooth (registered trademark), wireless USB (WUSB), or the like, for example. Furthermore, the communication device 913 may be a router for optical communication, a router for asymmetric digital subscriber line (ADSL), a modem for various communications, or the like. The communication device 913 can transmit and receive signals and the like according to a predetermined protocol such as TCP/IP, for example, with the Internet or another communication device, for example. The communication device 913 may form the I/F unit 110 shown in FIG. 2, for example. In addition, the communication device 913 can communicate with the output device 200 and the sensor device 300 shown in FIG. 2.

Note that the network 920 is a wired or wireless transmission path of information transmitted from a device connected to the network 920. For example, the network 920 may include the Internet, a public network such as a telephone network and a satellite communication network, or various local area networks (LANs) including Ethernet (registered trademark), a wide area network (WAN), or the like. Additionally, the network 920 may include a leased line network such as an Internet protocol-virtual private network (IP-VPN).

Hereinabove, an example of the hardware configuration capable of achieving the functions of the information processor 900 according to the embodiment has been shown. Each of the components described above may be implemented using a general-purpose member, or may be implemented by hardware specialized for the function of each component. Accordingly, the hardware configuration to be used can be changed as appropriate according to the technical level of each implementation of the embodiment.

Note that a computer program for achieving each function of the information processor 900 according to the embodiment described above can be prepared and implemented on a PC or the like. In addition, a computer readable recording medium in which such a computer program is stored can be provided. The recording medium is, for example, a magnetic disk, an optical disk, a magneto-optical disk, a flash memory, or the like. Additionally, the above computer program may be distributed through a network, for example, without using a recording medium.

6. CONCLUSION

Hereinabove, an embodiment of the present disclosure has been described in detail with reference to FIG. 1 to FIG. 15. As described above, the system 1 according to the embodiment uses the projection device to project, in the space in which the user is located, guidance information for guiding the user to the guidance location, on the basis of environment information regarding the space in which the user is located and user information. This makes it possible to help the user to notice by guiding the user to information that the user should notice. Specifically, the system 1 can notify the user of information that the user should notice, which is outside the user's view, by guiding the user's posture, position, and/or posture.

The present technology is applicable to various use cases. For example, the system 1 can notify the user in another room that the cooking time has elapsed on a kitchen timer. In addition, the system 1 can notify that there has been an incoming call to a smartphone that is not at hand when the user is relaxing, and can guide the user to a location where the smartphone is placed. Additionally, the system 1 can inform the user that a particular appliance is left powered on, and can guide the user to a switch location. Moreover, the system 1 can guide the user from the entrance to a location of the light switch in a case where the user comes home at night.

Although the preferred embodiments of the present disclosure have been described in detail with reference to the accompanying drawings, the technical scope of the present disclosure is not limited to such examples. It will be apparent to those skilled in the art of the present disclosure that various changes or modifications can be conceived within the scope of the technical idea described in the claims. It is understood that these also belong to the technical scope of this disclosure, as a matter of course.

Note that each device described in the present specification may be implemented as a single device, or part or all of the devices may be realized as separate devices. For example, the information processor 100, the output device 200, and the sensor device 300 shown in FIG. 2 may be configured as a single device. Further, for example, the information processor 100 shown in FIG. 2 may be configured as a server device connected to the output device 200 and the sensor device 300 by a network or the like. Further, for example, of the functional configuration example of the information processor 100 shown in FIG. 2, the controller 170 may be included in a device such as a server connected, through a network or the like, to the I/F unit 110, the guidance location setting unit 120, the guidance location storage unit 130, the user information detector 140, the environment information detector 150, and the environment information storage unit 160.

In addition, the processing described using the flowchart in the present specification does not necessarily have to be performed in the illustrated order. Some processing steps may be performed in parallel. Moreover, additional processing steps may be employed and some processing steps may be omitted.

In addition, effects described in this specification are merely illustrative or exemplary, and are not limiting. That is, the technology according to the present disclosure can exert other effects obvious to those skilled in the art from the description of the present specification together with or instead of the above-described effects.

Note that the following configuration is also within the technical scope of the present disclosure.

(1)

An information processor including a guidance controller that causes a projection device to project, in a space in which a user is located, guidance information for guiding the user to a guidance location, on the basis of environment information regarding the space and user information indicating a position and a line of sight of the user.

(2)

The information processor according to (1), in which the guidance controller switches a method of guiding the user on the basis of the environment information or the user information.

(3)

The information processor according to (2), in which the guidance controller determines a projection route of the guidance information on the basis of the environment information or the user information.

(4)

The information processor according to (3), in which the guidance controller determines the projection route so as to avoid a region that does not meet criteria for visibility of guidance information among regions included in the space.

(5)

The information processor according to any one of (3) or (4), in which the guidance controller determines the projection route on the basis of information regarding an illuminance or a color of a region included in the space.

(6)

The information processor according to any one of (3) to (5), in which the guidance controller changes a projection location of the guidance information in stages by tracking the user's line of sight.

(7)

The information processor according to any one of (3) to (6), in which the guidance controller changes a projection location of the guidance information in stages by tracking a position of the user.

(8)

The information processor according to any one of (3) to (7), in which:

the projection device includes a movable portion capable of changing a projection direction; and the guidance controller changes a projection location of the guidance information by changing the projection direction of the projection device.

(9)

The information processor according to any one of (2) to (8), in which the guidance controller determines what device the guidance controller shall cause to output the guidance information on the basis of the environment information or the user information.

(10)

The information processor according to (9), in which the guidance controller causes an audio output device to output a sound such that the sound comes to the user from a direction of a projection location of the guidance information.

(11)

The information processor according to any one of (2) to (10), in which the guidance information includes information indicating an action to be performed by the user for guidance.

(12)

The information processor according to (11), in which the guidance controller determines an action to be performed by the user, on the basis of the environment information or the user information.

(13)

The information processor according to any one of (1) to (12), in which the guidance information includes information indicating a degree of urgency.

(14)

The information processor according to any one of (1) to (13), in which the guidance information includes information indicating a guidance direction.

(15)

The information processor according to any one of (1) to (14), in which the guidance information includes information indicating a state of the guidance location in a representation in which a part of a shield is transparent.

(16)

The information processor according to any one of (1) to (15) further including a setting unit that sets the guidance location, in which the setting unit sets in advance the guidance location corresponding to a predetermined trigger.

(17)

The information processor according to any one of (1) to (16) further including a setting unit that sets the guidance location, in which the setting unit sets, as the guidance location, a location corresponding to notification information generated for the user.

(18)

The information processor according to any one of (1) to (17), in which the environment information includes information indicating a shape of an object forming the space.

(19)

An information processing method including a step of causing a projection device to project, in a space in which a user is located, guidance information for guiding the user to a guidance location, on the basis of environment information regarding the space and user information indicating a position and a line of sight of the user.

(20)

A recording medium that records a program for causing a computer to function as a guidance controller that causes a projection device to project, in a space in which a user is located, guidance information for guiding the user to a guidance location, on the basis of environment information regarding the space and user information indicating a position and a line of sight of the user.

REFERENCE SIGNS LIST

1 System
10 Guidance information
20 Smartphone
100 Information processor
110 I/F unit
120 Guidance location setting unit
130 Guidance location storage unit
140 User information detector
150 Environment information detector
160 Environment information storage unit
170 Controller
171 Display controller
173 Sound controller
200 Output device
210 Projector
230 Tablet
240 Smartphone
260 Speaker
270 Unidirectional speaker
300 Sensor device
310 Camera
320 Depth sensor
330 Microphone

The invention claimed is:

1. An information processor comprising a guidance controller configured to cause a projection device to project, in a space in which a user is located, guidance information for guiding the user to a guidance location, based on environment information regarding the space and user information indicating a position and a line of sight of the user, wherein the guidance controller causes the projection device to project the guidance information in a plurality of projection locations sequentially, and wherein the guidance controller is implemented via at least one processor.

2. The information processor according to claim 1, wherein the guidance controller switches a method of guiding the user based on the environment information or the user information.

3. The information processor according to claim 2, wherein the guidance controller determines a projection route of the guidance information between the plurality of projection locations based on the environment information or the user information.

4. The information processor according to claim 3, wherein the guidance controller determines the projection route so as to avoid a region that does not meet criteria for visibility of the guidance information among regions included in the space.

5. The information processor according to claim 3, wherein the guidance controller determines the projection route based on information regarding an illuminance or a color of the region included in the space.

6. The information processor according to claim 3, wherein the guidance controller changes between the plurality of projection locations of the guidance information in stages by tracking the user's line of sight.

7. The information processor according to claim 3, wherein the guidance controller changes between the plurality of projection locations of the guidance information in stages by tracking the position of the user.

8. The information processor according to claim 3, wherein:

the projection device includes a movable portion capable of changing a projection direction; and the guidance controller changes a projection location of the guidance information by changing the projection direction of the projection device.

9. The information processor according to claim 2, wherein the guidance controller determines what device the guidance controller shall cause to output the guidance information, based on the environment information or the user information.

10. The information processor according to claim 9, wherein the guidance controller causes an audio output device to output a sound such that the sound comes to the user from a direction of a projection location of the guidance information.

11. The information processor according to claim 2, wherein the guidance information includes information indicating an action to be performed by the user for guidance.

12. The information processor according to claim 11, wherein the guidance controller determines an action to be performed by the user, based on the environment information or the user information.

13. The information processor according to claim 1, wherein the guidance information includes information indicating a degree of urgency.

14. The information processor according to claim 1, wherein the guidance information includes information indicating a guidance direction.

15. The information processor according to claim 1, wherein the guidance information includes information indicating a state of the guidance location in a representation in which a part of a shield is transparent.

16. The information processor according to claim 1 further comprising:

a setting unit configured to set the guidance location, wherein the setting unit sets in advance the guidance location corresponding to a predetermined trigger, and wherein the setting unit is implemented via at least one processor.

17. The information processor according to claim 1 further comprising:

a setting unit configured to set the guidance location, wherein the setting unit sets, as the guidance location, a location corresponding to notification information generated for the user, and wherein the setting unit is implemented via at least one processor.

18. The information processor according to claim 1, wherein the environment information includes information indicating a shape of an object forming the space.

19. An information processing method comprising:

causing a projection device to project, in a space in which a user is located, guidance information for guiding the user to a guidance location, based on environment information regarding the space and user information indicating a position and a line of sight of the user, wherein the guidance information is projected in a plurality of projection locations sequentially.

20. A non-transitory computer-readable storage medium having embodied thereon a program, which when executed by a computer causes the computer to execute a method, the method comprising:

causing a projection device to project, in a space in which a user is located, guidance information for guiding the user to a guidance location, based on environment information regarding the space and user information indicating a position and a line of sight of the user, wherein the guidance information is projected in a plurality of projection locations sequentially.

\* \* \* \* \*